United States Patent [19]

Tan et al.

[11] Patent Number: 4,904,839
[45] Date of Patent: Feb. 27, 1990

[54] ELECTRODES FOR USE IN SPOT WELDING

[75] Inventors: Ryo Tan; Eiichi Shigekura; Shigeo Kidachi, all of Utsunomiya, Japan

[73] Assignee: Honda Giken Kogyo Kabushiki Kaisha, Tokyo, Japan

[21] Appl. No.: 288,187

[22] Filed: Dec. 22, 1988

[30] Foreign Application Priority Data

Dec. 25, 1987 [JP] Japan ............................... 62-327368
Dec. 26, 1987 [JP] Japan ............................... 62-196634
Dec. 26, 1987 [JP] Japan ............................... 62-196635
Dec. 26, 1987 [JP] Japan ............................... 62-196636
Dec. 26, 1987 [JP] Japan ............................... 62-196637

[51] Int. Cl.$^4$ ..................... B23K 11/30; B23K 35/00
[52] U.S. Cl. ................................................ 219/119
[58] Field of Search ............................... 219/119, 120

[56] References Cited

U.S. PATENT DOCUMENTS

| 1,176,614 | 3/1916 | Stanley | 219/119 |
| 2,701,834 | 2/1955 | Moore | 219/120 X |
| 3,363,086 | 1/1968 | Ecklund et al. | 219/119 |
| 3,665,145 | 5/1972 | Engel | 219/119 |
| 4,288,024 | 9/1981 | Nippert | 219/119 X |
| 4,843,206 | 6/1989 | Azuma et al. | 219/119 |

Primary Examiner—George H. Miller, Jr.
Attorney, Agent, or Firm—Armstrong, Nikaido, Marmelstein, Kubovcik & Murray

[57] ABSTRACT

Electrodes for use in spot welding which can spot-weld a metallic material having a large electric conductivity and a large thermal conductivity with a small electric current. A cup-shaped cap made of material having a small electric conductivity, a small thermal conductivity and a high melting point temperature as compared to the material to be welded, for instance, made of titanium, is fitted around a tip end portion of an electrode main body. The top surface of the cap is formed in a spherical shape having a large radius of curvature, and a depression is formed at the central portion of the top surface. The thickness of the top wall is thick at the central portion and thin at the peripheral portion. Plating of soft metal having a better thermal conductivity than the electrode main body is applied onto the entire inner surface of the cap coming into contact with the electrode main body. At least between the top wall of the cap and the tip end surface of the electrode main body, is interposed a plate member made of metal having a better electric conductivity than the electrode main body and a good thermal conductivity and a small hardness as compared to the cap. At least the top surface of the cap is subjected to nitriding treatment.

8 Claims, 3 Drawing Sheets

ELECTRODES FOR USE IN SPOT WELDING

BACKGROUND OF THE INVENTION

The present invention relates to electrodes to be used for carrying out spot welding of metallic materials having a high electric conductivity and a high thermal conductivity, and more particularly to an electrode structure that is preferable for small current welding.

Spot welding is a welding method in which two metal sheets are superposed on each other, then an electric current is made to flow through these metal sheets while pinching and pressing them with a pair of circular-rod-shaped electrodes, and the metal sheets are joined by heating and melting them with Joule's heat generated by the electric current. In the case of carrying out welding of metal sheets made of aluminum, aluminum alloy, magnesium alloy or the like having a high electric conductivity and a high thermal conductivity through this spot welding process, since the generated amount of Joule's heat is small and moreover the generated heat is dissipated through the members to be welded having a good thermal conductivity, a heavy current and a large pressing force (a pressing force exerted by the electrodes) are necessitated, and furthermore, the welding must be completed within a short period of time. Accordingly, a large-sized transformer is necessary, also in order to realize a large pressing force, a large-sized spot gun which deteriorates a workability must be employed, and therefor, it was difficult in the prior art to portabilize a welding machine.

Furthermore, even if a heavy current is used, upon carrying out multi-spot spot welding there was a shortcoming that due to the good electric conductivity of the members to be welded, a shunt current passing through an already completed welding point is produced, and the welding at the presently welding location could not be carried out soundly.

SUMMARY OF THE INVENTION

The present invention has been worked out under the above-mentioned technical background, and it is one object of the present invention to provide electrodes for use in spot welding which can spot-weld metallic materials having a high electric conductivity and a high thermal conductivity with a small electric current, whereby small-sizing (portabilization) of a single-phase A.C. type spot-melding machine can be contemplated.

This object is achieved by providing electrodes for use in spot welding, in which a cup-shaped cap made of a metallic material having a small electric conductivity, a small thermal conductivity and a high melting point temperature as compared to materials to be welded is put on the tip end of an electrode main body.

When spot-welding of members to be welded having a high electric conductivity and a high thermal conductivity is carried out by means of the above-mentioned electrodes, a large amount of contact resistance heat generation occurs at the contact boundary surface between the cap having high electric resistance and the members to be welded, the generated heat is efficiently transmitted to the members to be welded having a good heat transmission property, and this generated heat supplements the contact resistance heat generated at the contact boundary surface between the respective members to be welded, and contributes to formation of a nugget (a molten portion). Therefore, spot welding with a small current as compared to the prior art is possible, and portabilization of a single-phase A.C. type spot-welding machine can be contemplated.

In addition, according to the procedure of forming a nugget by injecting heat from the contact boundary surface between the cap and the member to be welded into the member to be welded, since a circular pillar-shaped nugget is produced in the portion pinched by the two electrodes, the portion of the member to be welded which has molten and thermally expanded acts to make the electrodes retreat, and especially a large pressure is exerted upon the central portion of the top surface of the cap, but concentration of the pressure can be avoided by forming a depression at the central portion, hence "pickup" (the phenomenon of the member to be welded adhereing to the electrode) and "errosion" (the phenomenon of the material of the member to be welded which has adhered to the electrode diffusing and penetrating into the electrode and being alloyed) would hardly occur, and an excellent continuous spotting capability can be insured. Furthermore, by forming a depression at the central portion of the top surface of the cap, the electric current that is liable to concentrate at the central portion can be dispersed to the surroundings, hence a temperature distribution over the top surface of the cap can be equalized and local heating of the members to be welded can be prevented, therefore in this means also "pickup" and "errosion" would hardly occur, an excellent continuous spotting capability can be insured, and moreover, a large nugget diameter can be realized.

In order to disperse the electric current liable to concentrate at the central portion to the surroundings, a wall thickness at the central portion of the cap top wall could be made thick as compared to the surrounding portion.

If plating of soft metal having a better thermal conductivity than the electrode main body is applied onto the entire inner surface of the cap, then a tight adhesion property between the electrode main body and the cap is improved, and so, cooling of the cap by the water-cooled electrode main body is effected efficiently. In addition, a contact resistance between the electrode main body and the cap becomes small, and hence a large electric current density can be insured. Furthermore, since the above-mentioned plating layer achieves the role of diffusing the heat at the central portion to the surrounding portion, injection of heat into the materials to be welded is effected uniformly over the entire contact surface.

By inserting a sheet body made of metal having a better electric conductivity than that of the electrode main body, and an excellent thermal conductivity and a small hardness as compared to those of the cap at least between the top wall of the cap and the tip end surface of the electrode main body, also a similar advantage to the aforementioned plating can be obtained.

Furthermore, by subjecting at least the top surface of the cap to nitriding treatment, generation of "pickup" and "errosion" can be prevented, a rigidity of the top wall is increased, a resistance against deformation is increased, thus good contact relationship between the top wall and the member to be welded is always maintained, and a durability of the cap can be improved.

DETAILED DESCRIPTION OF THE PREFERRED EMBODIMENTS

Figure 1:
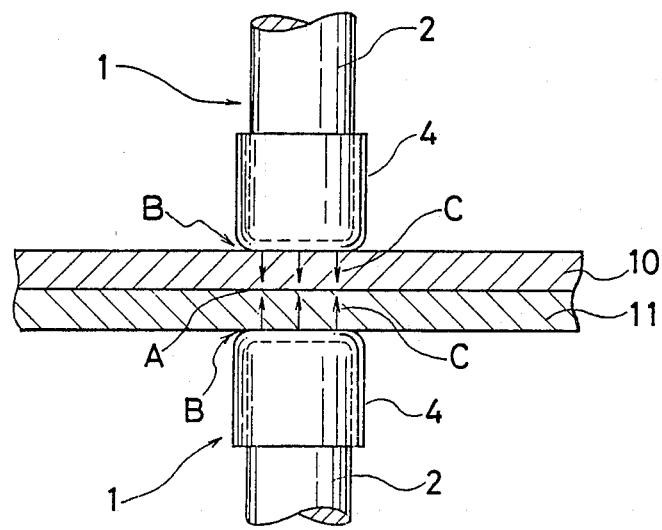
FIG. 1 and 2 are schematic views showing spot welding making use of the electrodes according to the present invention.

At first, description will be made on the reasons why small-current spot welding is possible by making use of the electrodes according to the present invention, with reference to FIGS. 1 and 2. These figures show the state where members 10 and 11 to be welded consisting of sheet members made of metallic material having a high electric conductivity and a high thermal conductivity such as aluminum alloy are superposed on each other and these are pinched by upper and lower electrodes 1, 1. The electrode 1 is an electrode formed by fitting a cup-shaped cap 4 made of metallic material having a small electric conductivity, a small thermal conductivity and high melting point temperature as compared to the members 10 and 11 to be welded, around a tip end of an electrode main body 2 made of the conventional electrode material (for example, Cu-Cr alloy).

Figure 2:
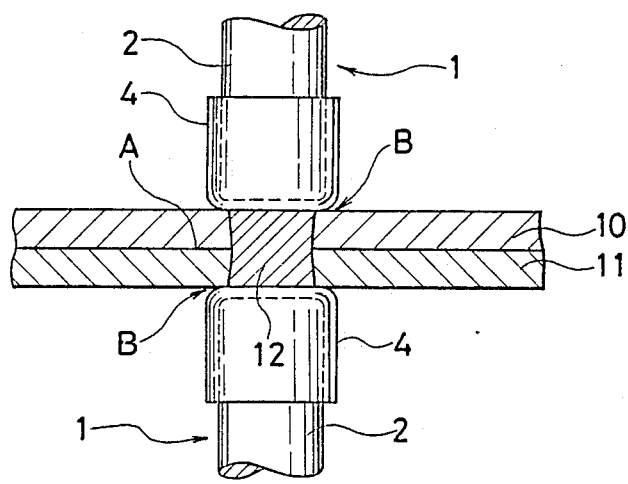

In FIG. 1, if an electric current is made to pass through the members 10 and 11 to be welded under a similar current condition to that of welding of milled steel sheets (under a small current condition), then though it is a matter of course that contact resistance heat generation occurs at the contact boundary surface A between the members 10 and 11 to be welded, large contact resistance heat generation would occur at the contact boundary surfaces B between the caps 4, 4 made of materials having a high electric resistance and the members 10 and 11 to be welded, and the caps 4,4 themselves also generate Joule's heat. Accordingly, the heat generated at the contact boundary surfaces B, B and in the caps 4, 4 would be efficiently transmitted to the members 10 and 11 to be welded which are good heat conductor, as indicated by arrows C. If the members to be welded are milled steel sheets, a nugget (molten portion) must be produced in the proximity of the boundary surface A by the contact resistance heat generation at the contact boundary surface A. However, in the illustrated example, since the members 10 and 11 to be welded are made of materials having a high electric conductivity and a high thermal conductivity such as aluminum alloy, a nugget would not be produced by only the heat generated at the contact boundary surface, but the portion of the members 10 and 11 sandwiched between the caps 4, 4 would rise in temperature by the heat transmitted from the caps 4,4 heated up to a high temperature (arrows C), as a result an electric resistance of that portion becomes high, and as assisted by the fact that the amount of Joule's heat generated in that portion of the members 10 and 11 to be welded (sandwiched between the caps 4,4) is increased, the members 10 and 11 to be welded are molten in a circular-pillar shape, resulting in a nugget 12 as shown in FIG. 2. At this moment, if the melting point temperature of the cap 4 is sufficiently high as compared to that of the members 10 and 11 to be welded, melting of the cap 4 would never occur.

Here, an essential condition required for the electrodes for use in spot welding is that a continuous spotting capability is excellent. While carbon steel, stainless steel, titanium (Ti), etc. can be enumerated as materials for use as the caps 4 having a small electric conductivity and a small thermal conductivity as compared to the members 10 and 11 to be welded which are made of aluminum alloy or the like (See Table-1), taking into consideration the continuous spotting capability, titanium is most suitable. Besides the characteristics of a high melting point, a small coefficient of thermal expansion and a small thermal conductivity, titanium has appropriately large strength and tenacity, and by making use of caps 4 made of titanium, "pickup" (the phenomenon of the members to be welded adhering to the electrodes) and "errosion" (the phenomenon of the material of the member to be welded which has adhered to the electrode dispersing and penetrating into the electrode and alloying) can be prevented, and an excellent continuous spotting capability can be insured.

TABLE-1

| Material property | Fe | JIS SUS 304 | Miled Steel | Ti | Al |
|---|---|---|---|---|---|
| Melting Point (°C.) | 1530 | 1450 | 1520 | 1730 | 660 |
| Electric Resistance ($\Omega \cdot cm \times 10^{-6}$) | 9.8 10 | 25 30 | 14.0 | 42 55 | 2.7 |
| Electric conductivity (relative to Copper) | — | 2.3 | — | 3.1 | 30 |
| Thermal Conductivity (cal/cm · sec.°C.) | 0.15 | 0.039 | 0.13 | 0.041 | 0.49 |
| Coefficient of Thermal Expension ($\times 10^{-6}$)(at Room Temperature) | 11.7 | — | — | 9 | 23 |

The shape of the caps 4 is important for improving the continuous spotting capability. The top surface of the cap 4 is formed into a shape close to a spherical surface, that is, into a rounded shape. However, the pressure at the contact surface with the members 10 and 11 to be welded is largest at the central portion of the top surface, and when the caps 4 and the members 10 and 11 to be welded rise in temperature and thermally expand as a result of an electric current passing therethrough, the tendency would become more remarkable. Consequently the electric current would concentrate at the central portion of the top surface of the cap 4, the central portion becomes a heated condition, and as a result of the fact that heat is injected concentrically into the members 10 and 11 to be welded within a small area, the diameter of the nugget 12 becomes small and the nugget 12 also becomes a heated condition, resulting in a "pickup" phenomenon, and eventually, a continuous spotting capability of the cap 4 is lowered.

According to the present invention, the above-mentioned problem has been resolved by forming a depression (See reference numeral 7 in FIG. 3) at the central portion of the top surface of the cap 4. In a cap 4 having a depression at the central portion of the top surface, an electric current is dispersed to the surroundings, hence contact resistance heat is generated uniformly at the contact boundary surfaces B between the caps 4 and the members 10 and 11 to be welded, local heating of the caps 4 and the members 10 and 11 to be welded would not occur, a nugget 12 having a sufficiently large diameter can be formed, and so, generation of "pickup" and accompanying "errosion" can be avoided. In addition, a coefficient of thermal expansion of the members 10 and 11 to be welded which are formed of aluminum alloy, magnesium alloy or the like is large, hence high-temperature molten portions of the members 10 and 11 to be welded which have thermally expanded to the maximum extent would come into contact with the central portions of the top surfaces of the caps 4 and the surface pressure at these portions would become excessively large, but since depressions are formed at the central portions of the top surfaces of the caps 4, a part of the thermally expanded high-temperature molten portion would enter into the depression, thereby the rise of the surface pressure is mitigated, and so, generation of "pickup" and accompanying "errosion" can be prevented.

Also, according to the present invention, the aforementioned problem has been resolved by forming the top wall of the cap 4 made of titanium so as to be thick at the central portion and to be thin at the peripheral portion. This structure makes use of the fact that an electric resistance is proportional to a magnitude of a wall thickness. A current density at the central portion of the top wall is lowered, while a current density at the peripheral portion increases. As a result, the current liable to concentrate at the central portion of the top wall is dispersed over the entire top wall, hence uniform contact resistance heat is generated over the entire contact boundary surface between the top wall and the member to be welded, injection of heat into the material to be welded is effected uniformly over a large area, and under a condition not associated with local heating, a large nugget diameter as shown in FIG. 2 can be obtained.

In addition, owing to the fact that the current density in the top wall is equalized from the central portion up to the peripheral portion, local heating of the members to be welded can be prevented. Therefore, the phenomenon that members to be welded made of aluminum alloy, magnesium alloy having a large coefficient of thermal expansion as compared to steel melt and thermally expand, and the consequently increasing contact surface pressure between the members and the top walls of the caps 4 would become excessively large at the central portion of the top wall, can be prevented. Thus, "pickup" and the accompanying "errosion" are suppressed, and a good continuous spotting capability can be insured.

Furthermore, in the case of the electrode according to the present invention, since a small electric current is made to flow, contact resistance heat generated at the contact boundary surfaces between the caps 4 and the members 10 and 11 to be welded is injected into the members 10 and 11 to be welded, and thereby a nugget is produced, a shunt current passing through already welded points does not become an issue.

Figure 3:
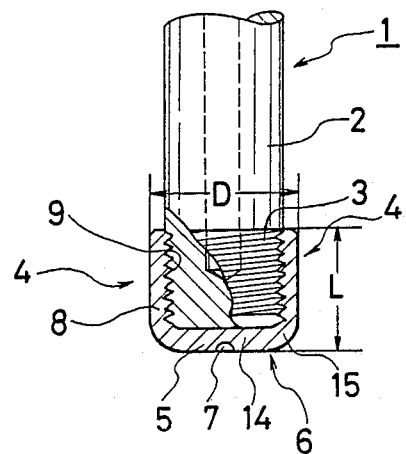
FIG. 3 is a schematic view partly cut away showing a spot welding electrode according to one preferred embodiment of the present invention.

FIG. 3 shows an electrode 1 according to one preferred embodiment of the present invention. The electrode 1 is constructed by threadedly fitting a cup-shaped cap 4 made of titanium around a threaded portion 3 formed at its tip end. The cap 4 is formed of a top wall 5 and a circumferential wall 8, a circular-hole-shaped depression 7 is formed on the outer surface of the top wall 5, that is, at the central portion of a top surface 6, and female screw threads 9 to be engaged with the male screw threads 3 are formed on the inner circumferential surface of the circumferential wall 8. In addition, the top surface 6 of the cap 4 is formed as one part of a spherical surface (called "rounded shape"), and as a result, the thickness of the top wall 5 is thick at the central portion 14 and thin at the peripheral portion 15. The radius of curvature of the spherical surface is sufficiently large as compared to the outer diameter D of the circumferential wall 8.

With the cap 4 formed in the above-mentioned shape, owing to the fact that the depression 7 is formed at the central portion of the top surface 6 and the thickness of the top wall 5 is thick at the central portion 14 but is thin at the peripheral portion 15, local heating at the contact boundary surface between the cap 4 and the member to be welded would not occur as described above, also excessively large rise of the surface pressure at the central portion can be avoided, hence "pickup" and the accompanying "errosion" of the cap 4 can be prevented, and thereby an excellent continuous spotting capability can be insured.

When the electrode 1 are brought into contact with the members to be welded and pressurization and electric current feed are effected, a heavy load caused by the pressurization is applied to the caps 4, and also a thermal impacting stress caused by abrupt temperature rise is generated in the caps 4. In order to mitigate the stress generated in the caps 4 by the action of the above-mentioned load and the above-mentioned thermal impact, it is effective to elongate the length (L) of the cap 4. In addition, by enlarging the length (L), a heat capacity is increased, and also by increasing the contact area with the electrode main body 2 at the threaded portion, heat transmission to the water-cooled electrode main body 2 is well effected. Also, as the coupling area with the electrode main body 2 is increased, loosening of the cap 4 can be prevented. If consideration is made to the fact that when loosening of the cap 4 arises, the top wall 5 of the cap 4 would be separated from the tip end surface of the electrode main body 2, the top wall 5 would retreat and deform due to the pressing force and the contact with the member to be welded could not be maintained correctly, to prevent the loosening of the cap 4 means that the durability of the cap 4 can be improved.

Furthermore, upon carrying out spot welding, to preliminarily apply silicon oil onto the top surface 6 of the cap 4 or onto the electrode butting surface of the member to be welded is effective. Then "pickup" and the accompanying "errosion" can be suppressed and a continuous spotting capability is improved. The flash point of silicone oil is low (172° C.), and it is evaporated, burnt and carbonized under a high pressure by the contact resistance heat generated at the contact boundary surface between the cap 4 and the member to be welded, and a hard thin coating film having a large high-temperature strength is formed. This coating film protects the top surface 6 of the cap 4 and suppresses "pickup" and "errosion", and a nugget having always stable quality can be obtained.

Figure 4:
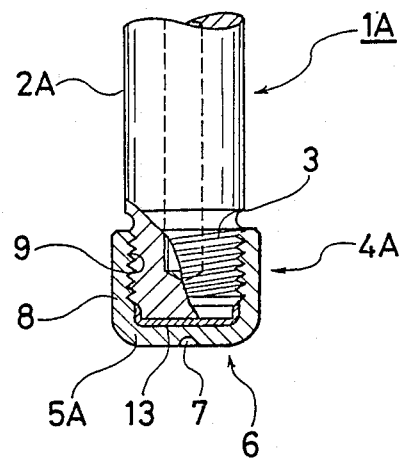
FIG. 4 is a schematic view partly cut away showing a spot welding electrode according to another preferred embodiment of the present invention.

In an electrode 1A shown in FIG. 4, the construction is different from that of the electrode 1 in that nitriding treatment is applied onto the entire surface of a cap 4A made of titanium, copper plating treatment is applied to the entire inner surface of the cap 4A after the nitriding treatment, and an insert sheet 13 made of silver is sandwiched between an electrode main body 2A and a top wall 5A.

Effects and advantages obtained by employing the construction different from the electrode 1 are as follows:

1. Nitriding Treatment... By the nitriding treatment, a surface hardness and a rigidity of the cap 4A are improved. A hardness of titanium material not subjected to nitriding treatment is about Hv 200, while a hardness of titanium material after nitriding treatment is about Hv 1000, and rise of the hardness is remarkable. If the surface hardness of the cap 4A is large, molten material of the member to be welded would hardly adhere to the cap 4A, accordingly "pickup" and "errosion" can be effectively suppressed, and as assisted by an excellent abrasion-resistance, improvements in a continuous spotting capability can be contemplated.

If a rigidity of the cap 4A is large, generation of strain caused by pressurized contact with the members to be welded, and generation of strain caused by generation of thermal impacting stress accompanying abrupt temperature rise upon electric current feed, would be little, and so, a deformation preventing effect is large.

Also, in contrast to the fact that a specific electric resistance of titanium not subjected to nitriding treatment is 50 $\mu\Omega$.cm at the maximum, a specific electric resistance of TiN is 130 $\mu\Omega$.cm at the maximum, and thus an electric resistance of the cap 4A is increased by nitriding treatment. Accordingly, a contact resistance between the cap 4A and the member to be welded is increased, hence promotion of heat generation can be achieved, and thus formation of a nugget becomes further easy.

Figures 5A, 5B:
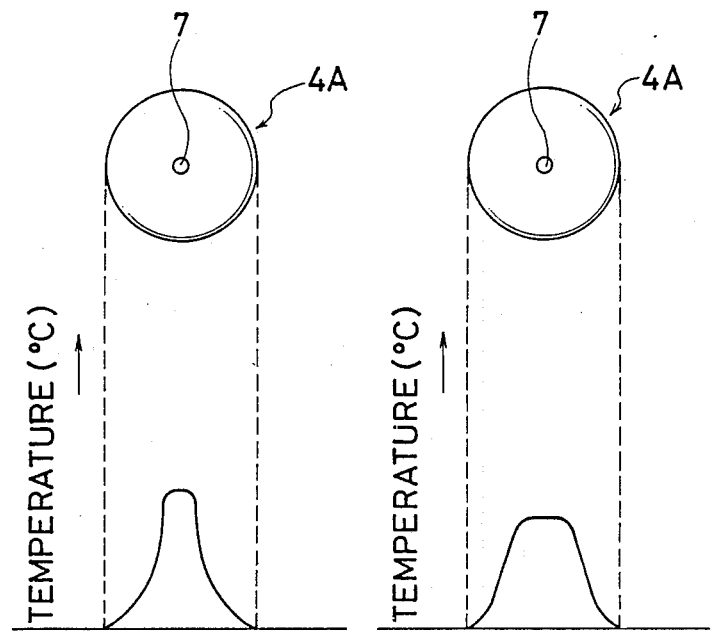
FIGS. 5a and b are diagrams showing a difference in the temperature distribution over the cap top surface upon making a welding current flow between existence and non-existences of a copper plating film on the inner surface of the cap made of titanium, the case where the film is not present is shown at (a), while the case where the film is present is shown at (b).

2. Copper Plating Treatment... In the case where copper plating treatment is not applied to the cap 4A, upon feeding an electric current, Joule's heat would concentrate at the central portion of the top wall 5A of the cap 4A, and hence a temperature difference between the central portion and the peripheral portion is large (See the temperature distribution curve in FIG. 5(a)), whereas in the cap 4A subjected to copper plating treatment, concentration of Joule's heat at the central portion is mitigated, and so, a temperature difference between the central portion and the peripheral portion is small (See the temperature distribution curve in FIG. 5(b)). Accordingly, by applying copper plating treatment, local heating of the members to be welded can be prevented, generation of "pickup" and "errosion" is suppressed, and improvements in a continuous spotting property can be contemplated.

As the cap 4A is a member acting as a heat source for the members to be welded, it is favorable that its temperature rises to a certain extent, but excessive temperature rise must be avoided because it promotes deterioration of the cap 4A. In this mean, it is effective to deposit a copper plating film having a good thermal conductivity onto the inner surface of the cap 4A, and as heat transmission to the water-cooled electrode main body 2A is effected smoothly, overheating of the cap 4A can be prevented.

In place of the copper plating treatment, plating treatment making use of other soft metal, for example, silver could be applied.

3. Use of Silver Insert Plate 13... The insert plate 13 is not limited to silver, but it is only required to be formed of metal having a better electrical conductivity than the electrode main body 2A, a better thermal conductivity than the cap 4A and a smaller hardness than the cap 4A. Its effects and advantages are similar to the case of silver plating treatment, and owing to the facts that the insert plate 13 can well tightly adhere to the electrode main body 2A and the cap 4A, hence an electric current efficiency is improved by reduction of the contact resistance between the electrode main body 2A and the cap 4A, Joule's heat that is apt to concentrate at the central portion of the top wall 5A is dispersed over the peripheral portion of the top wall 5A, and since the temperature difference between the central portion and the peripheral portion is thus reduced, enlargement of the nugget diameter by preventing local overheating of the members to be welded as well as improvements in a continuous spotting property by suppressing "pickup" and "errosion" can be contemplated. In addition, the insert plate 13 improves heat transmission from the cap 4A to the electrode main body 2A, and thereby overheating of the cap 4A can be prevented.

Furthermore, it was described previously that upon feeding an electric current, a large load caused by pressurization would act upon the cap 4A and also a thermal impacting stress caused by abrupt temperature rise would be produced in the cap 4A. For the purpose of mitigating the action of the load and the stress produced in the cap 4A by a thermal impact, it is effective to interpose the insert plate 13 between the top wall 5A and the electrode main body 2A. More particularly, against the load acting upon the top wall 5A due to a pressing force, the insert plate 13 functions as a buffer, while against the thermal impact the insert plate 13 functions as a good heat transmission medium to the water-cooled electrode main body 2A, thereby abrupt temperature rise of the top wall 5A can be prevented, and deterioration of the top wall 5A can be suppressed.

Welding Test

The electrode 1A which provides the aformentioned effects and advantages was employed as a sample according to the present invention, and spot welding of two aluminum alloy plates (plate thickness: 1.0 mm) was carried out by making use of a single-phase A.C. type portable welding machine for use in welding of steel plates. In addition, for the purpose of comparison, spot welding of two aluminum alloy plates (plate thickness: 1.0 mm) was carried out without employing the caps made of titanium by making use of 1. a single-phase A.C. type portable welding machine for use in welding of steel plates (Contrast I), 2. a single-phase A.C. type stationary welding machine (Contrast II), and 3. single-phase rectifier type portable welding machine for use in welding of aluminum plates. The welding conditions and the results of welding (a nugget diameter, a tensile shearing strength (average values)) are shown in Table-2 below.

TABLE 2

|  | Electric Current (A) | Welding Time (Cycles) | Pressing Force (kg) | Electrode Main Body Diameter (mm) | Nugget Diameter (mm) | Tensile Shearing Strength (kg) |
| --- | --- | --- | --- | --- | --- | --- |
| Sample of the Present Invention | 7,600 7,800 | 13 | 200 | 12 | 7.4 | 310 |
| Contrast I | 10,000 15,000 | 15 20 | 200 | 12 | not deposited | — |
| Contrast II | 32,000 | 6 | 280 300 ↑ | 16 | 7.4 | 320 |
| Contrast III | 32,500 | 6 |  | 16 | 7.2 | 270 |

Evaluation of Test Results

1. From comparison between the Sample of the Present Invention and the Contrast I, it is seen that welding with a small current in a short welding time that was impossible in the prior art becomes possible by making use of the cap 4A made of titanium.

2. From comparison between the Sample of the Present Invention and the Contrasts II and III, it is seen that by employing the cap made of titanium, a nugget diameter and a tensile shearing strength equal to or superior to those obtained by welding with a large current and a large pressing force can be obtained even if welding is carried out with a small current and a small pressing force.

3. It was confirmed that with the Sample of the Present Invention, welding of continuous 100 spotting can be carried out.

4. When "pickup" or "errosion" has been generated on the electrode, the corresponding portion must be removed, and in contrast to the fact that in the case of Contrasts II and III the removing work was necessary for welding at every five spots, in the case of the Sample of the Present Invention, the removing work was necessitated for welding at every ten spots. From this it is seen that with the caps 4A made of titanium, "pickup" and "erosion" would hardly occur, hence a continuous spotting property is improved, and eventually improvements in a productivity can be achieved.

What is claimed is:

1. An electrode for use in spot welding, in which a cup-shaped cap made of metallic material having a small electric conductivity, a small thermal conductivity and a high melting point temperature as compared to those of members to be welded, is fitted around a tip end of an electrode main body; said cap has its top surface formed in a shape close to a spherical surface; and a depression is formed at the central portion of said top surface.

2. An electrode for use in spot welding, in which a cup-shaped cap made of metallic material having a small electric conductivity, a small thermal conductivity and a high melting point temperature as compared to those of members to be welded, is fitted around a tip end of an electrode main body; and said cap is made of titanium.

3. An electrode for use in spot welding, in which a cup-shaped cap made of metallic material having a small electric conductivity, a small thermal conductivity and a high melting point temperature as compared to those of members to be welded, is fitted around a tip end of an electrode main body; said cap has its top surface formed in a shape close to a spherical surface; and a wall thickness of the top wall is thick at the central portion and thin at the peripheral portion.

4. An electrode for use in spot welding, in which a cup-shaped cap made of metallic material having a small electric conductivity, a small thermal conductivity and a high melting point temperature as compared to those of members to be welded, is fitted around a tip end of an electrode main body; and plating of soft metal having a better thermal conductivity than the electrode main body is applied over the entire inner surface of the cap coming into contact with the electrode main body.

5. An electrode as claimed in claim 4, in which said soft metal is copper or silver.

6. An electrode as claimed in claim 5, in which the metal forming said plate member is silver.

7. An electrode for use in spot welding, in which a cup-shaped cap made of metallic material having a small electric conductivity, a small thermal conductivity and a high melting point temperature as compared to those of members to be welded, is fitted around a tip end of an electrode main body; and a plate member made of metal having a better electric conductivity than the electrode main body and a good thermal conductivity and a small hardness as compared to the cap, is interposed at least between the top wall of the cap and the tip end surface of the electrode main body.

8. An electrode as claimed in any one of claim 1 to 5, in which said cap has at least its top wall subjected to nitriding treatment.

* * * * *